United States Patent
Kai

(10) Patent No.: US 9,813,956 B2
(45) Date of Patent: Nov. 7, 2017

(54) BASE STATION DEVICE AND HANDOVER CONTROL METHOD

(71) Applicant: NEC Corporation, Tokyo (JP)

(72) Inventor: Kenji Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/776,744

(22) PCT Filed: Mar. 7, 2014

(86) PCT No.: PCT/JP2014/001271
§ 371 (c)(1),
(2) Date: Sep. 15, 2015

(87) PCT Pub. No.: WO2014/141650
PCT Pub. Date: Sep. 18, 2014

(65) Prior Publication Data
US 2016/0037403 A1   Feb. 4, 2016

(30) Foreign Application Priority Data
Mar. 15, 2013   (JP) ................................ 2013-054406

(51) Int. Cl.
*H04W 36/00*   (2009.01)
*H04W 36/22*   (2009.01)
(Continued)

(52) U.S. Cl.
CPC ... *H04W 36/0083* (2013.01); *H04W 36/0061* (2013.01); *H04W 36/22* (2013.01);
(Continued)

(58) Field of Classification Search
None
See application file for complete search history.

(56) References Cited

U.S. PATENT DOCUMENTS

| 9,313,710 B2 | 4/2016 | Nanri et al. |
| 2004/0121777 A1* | 6/2004 | Schwarz ............... H04W 36/22 |
| | | 455/452.1 |

(Continued)

FOREIGN PATENT DOCUMENTS

| JP | 11-251995 | 9/1999 |
| JP | 2011-525759 | 9/2011 |

(Continued)

OTHER PUBLICATIONS

3GPP TS36.300, Evolved Universal Terrestrial Radio Access (E-UTRA) and Evolved Universal Terrestrial Radio Access Network; Overall description; Stage 2, VIO2.0.

(Continued)

*Primary Examiner* — Moustapha Diaby
(74) *Attorney, Agent, or Firm* — Young & Thompson

(57) ABSTRACT

[Problem] To provide a base station device and a handover control method capable of avoiding a situation in which the base station device of a cell becomes overloaded when the cell transitions from an inactive state to an active state. [Solution] A base station device (100) having: an adjacent base station information table (150) for storing adjacent base station information that includes handover suppression information correlated with an adjacent cell (200a) managed by an adjacent base station device (200), and also includes the processing capacity index of the adjacent base station device; and a handover control unit (130) for limiting the handover of a mobile terminal device (300) under control to an activated adjacent cell on the basis of the handover suppression information and the processing capacity index when the adjacent cell transitions from an inactive state to an active state.

8 Claims, 8 Drawing Sheets

(51) Int. Cl.
*H04W 36/38* (2009.01)
*H04W 52/02* (2009.01)

(52) U.S. Cl.
CPC ....... *H04W 36/38* (2013.01); *H04W 52/0203* (2013.01); *Y02B 60/50* (2013.01)

(56) References Cited

U.S. PATENT DOCUMENTS

| | | | |
|---|---|---|---|
| 2006/0293060 A1* | 12/2006 | Yang | H04W 36/22 |
| | | | 455/453 |
| 2007/0058588 A1* | 3/2007 | Fashandi | H04W 36/0055 |
| | | | 370/331 |
| 2007/0058662 A1* | 3/2007 | Yoshikawa | H04L 12/40143 |
| | | | 370/447 |
| 2007/0173257 A1 | 7/2007 | Bakker et al. | |
| 2010/0003986 A1 | 1/2010 | Chen | |
| 2010/0080194 A1* | 4/2010 | Kawasaki | H04W 72/085 |
| | | | 370/332 |
| 2011/0164593 A1* | 7/2011 | Huet | H04W 36/0055 |
| | | | 370/333 |
| 2011/0170466 A1* | 7/2011 | Kwun | H04W 52/0235 |
| | | | 370/311 |
| 2012/0082028 A1 | 4/2012 | Kojima | |
| 2013/0130670 A1 | 5/2013 | Samdanis et al. | |
| 2014/0073311 A1 | 3/2014 | Xu et al. | |

FOREIGN PATENT DOCUMENTS

| | | |
|---|---|---|
| JP | 2012-080253 | 4/2012 |
| JP | 2012-231366 | 11/2012 |
| JP | 2013-509761 | 3/2013 |
| WO | 2011/127851 | 10/2011 |

OTHER PUBLICATIONS

3GPP TS36.423, Evolved Universal Terrestrial Radio Access Network (E-UTRAN); X2 Application Protocol (X2AP), V9.2.0.
International Search Report PCT/JP2014/001271 dated Jun. 10, 2014.
Extended European Search Report—EP 14 76 2368—dated Aug. 31, 2016.
Japanese Official Action—2015-505272—dated Oct. 4, 2016.

\* cited by examiner

NEIGHBORING BASE STATION INFORMATION TABLE150

| NEIGHBORING BASE STATION DEVICE ID | NEIGHBORING CELL INFORMATION | SURROUNDING CELL INFORMATION | HO INHIBITION TIMER | THE NUMBER OF TIMES OF EXECUTING HO TO NEIGHBORING CELL | PROCESSING CAPABILITY INDEX |
|---|---|---|---|---|---|
| BS1 | C1a | C1a-1, C1a-2... | ON / T1a | N1 | P1a |
|  | C1b | C1b-1, C1b-2... | OFF | - | P1b |
|  | C1c | C1c-1, C1c-2... | OFF | - | P1c |
| BS2 | C2a | C2a-1, C2a-2... | ON / T2a | N2 | P2a |
| ..... | ..... | ..... | ..... | ..... | ..... |

BASE STATION DEVICE AND HANDOVER CONTROL METHOD

TECHNICAL FIELD

The present invention relates to a wireless communication system and, more particularly, to a base station device and a handover control method, which perform handover control.

BACKGROUND ART

As one of measures to improve a system throughput in a cellular network, there is a technique of arranging a plurality of small base-station devices in a macrocell provided by a base station device. Because an area of a small cell provided by the small base-station device is small, a mobile terminal device is not necessarily present in the small cell. Accordingly, in a state in which no mobile terminal device is present in the small cell, electric power consumed by the small base-station device is wasted. Thus, in 3GPP (3rd Generation Partnership Project), Energy Saving function is proposed as one of SON (Self Organization Networks) functions (NPTL1).

A small base-station device having the Energy Saving function has an active state and an inactive state. In the active state, such device performs a normal operation as the small base-station device. In the inactive state, power saving of the entire network is realized by stopping radio transmission in a part or the whole of the cells. The state-transition of the active state/inactive state of the cell can be controlled according to a traffic amount. For example, based on statistical data of traffic change, the number of the small base-station devices in operation is increased in a time zone, such as a traffic peak time, in which the traffic amount is large. In a time zone, such as an off-peak time, in which the traffic amount is small, the number of the small base-station devices in operation is reduced.

However, the stopping of the radio transmission may have a large impact on the mobile terminal device and neighboring cells. Thus, when an own cell transfers to an inactive state, specification of a signal notifying the neighboring cell of the transition of the own cell to an inactive state is performed as specific processing for reducing the impact. In addition, a signal requesting an inactive cell to become active is specified (NPTL2). The notification and request messages are usually transmitted via an inter-base-station interface between the base station devices which control target cells.

Furthermore, in a mobile communication system having a plurality of base station devices like a cellular network, mobility control or handover control is performed, which switches base stations so that communication is continued when a mobile terminal device moves from a cell provided one of the base station devices to another cell provided by another of the base station devices. Handover of the mobile terminal device is controlled, based on a value measured and reported by the mobile terminal device, by the base station device providing a cell in which the mobile terminal device is located. Generally, the base station device controls the handover to select a better cell (or best cell) in respect of radio wave reception environment for the mobile terminal device and to hand over the mobile terminal to the selected cell.

Hereinafter, a general handover control procedure is briefly described with reference to FIG. 1. Incidentally, a cell in which a mobile terminal device is present is referred to as a serving cell. A base station device of a serving cell is referred to as a serving base station device. A handover destination cell is referred to as a target cell. A base station device of a target cell is referred to as a target base station device.

In FIG. 1, a serving base station device sets measurement conditions, measurement reporting conditions, and the like by transmitting a measurement setting message M100 to a mobile terminal device. The mobile terminal device measures reference signal received power (RSRP: Reference Signal Received Power), reference signal received quality (RSRQ: Reference Signal Received Quality), or other parameters of each of the serving cell and the neighboring cell according to the measurement conditions set by the serving base station device (operation S100). The parameters includes reference signal received power (RSRP: Reference Signal Received Power), reference signal received quality (RSRQ: Reference Signal Received Quality), or other parameters. Then, if a measurement result satisfies the measurement reporting conditions, a measurement reporting message M101 is transmitted to the serving base station device.

The serving base station device performs handover execution determination, based on a measurement report received from the mobile terminal device (operation S101). In the handover execution determination, a target cell is determined by judging whether handover execution is necessary. In the determination of a target cell, generally, a cell is selected, which is better in radio wave reception environment for the mobile terminal device. Subsequently, the serving base station device transmits, when the target cell is determined, a handover request message M102 including information concerning the mobile terminal device to the target base station device.

The target base station device performs, upon the handover request received from the serving base station device, judging of acceptance of a mobile terminal device (operation S102). The judging of acceptance is performed, based on access control rules such as access authority of the mobile terminal device and a load of the target base station device. If the mobile terminal device is determined to be acceptable, handover preparation such as securement of data resources for the mobile terminal device is executed. Then, if handover is determined to be acceptable, the target base station device transmits, to the serving base station device, a handover request response message M103 including a handover instruction to the mobile terminal device.

Upon the handover request response, the serving base station device transmits, to the mobile terminal device, a handover instruction message M104 received from the target base station device. In response to the handover instruction, the mobile terminal device transmits a handover instruction response to the target base station device. Thus, the handover control procedure is completed.

Incidentally, a method is proposed, which determines, when a target base station is determined, a preferential order by considering not only quality of the radio wave reception environment but capability of the neighboring base station (see PTL1).

CITATION LIST

Patent Literature

[PTL1] Japanese Patent Application Laid-Open No. 2011-525759

Non-Patent Literatures

[NPTL1] 3GPP TS36.300, Evolved Universal Terrestrial Radio Access (E-UTRA) and Evolved Universal Terrestrial Radio Access Network; Overall description; Stage 2, V10.2.0
[NPTL2] 3GPP TS36.423, Evolved Universal Terrestrial Radio Access Network (E-UTRAN); X2 Application Protocol (X2AP), V9.2.0

SUMMARY OF INVENTION

Technical Problem

However, when a base station device makes an inactive cell of a small base-station device transfer to an active state, radio wave reception environment of the activated cell may be better for a mobile terminal device being present in vicinity of the activated cell than radio wave reception environment of the serving cell. When many such mobile terminal devices are present, many mobile terminal devices are simultaneously handed over to the small base-station device by the handover control. Generally, the small base-station device is low in processing capability, compared to the base station device. Thus, increase in local processing load has a high probability of causing a congestion state of the small base-station. Consequently, there is a problem that service quality is degraded due to a handover failure and a processing delay.

Accordingly, an object of the present invention is to provide a base station device and a handover control method capable of avoiding, when a cell transfers from an inactive state to an active state, a situation in which a base station device of the cell is overloaded.

Solution to Problem

A base station device according to the present invention is a base station device in a wireless communication system, which includes a neighboring base station information storage means that stores neighboring base station information including handover inhibition information associated with a neighboring cell managed by a neighboring base station device, and a processing capability index of the neighboring base station device, and a handover control means that limits that, when the neighboring cell transfers from an inactive state to an active state, a mobile terminal device hands over to the activated neighboring cell, based on the handover inhibition information and the processing capability index.

A handover control method according to the present invention is a handover control method in a wireless communication system, which includes storing neighboring base station information including handover inhibition information associated with a neighboring cell managed by a neighboring base station device, and a processing capability index of the neighboring base station device, and limiting that, when the neighboring cell transitions from an inactive state to an active state, a mobile terminal hands over to the activated neighboring cell, based on the handover inhibition information and the processing capability index.

Advantageous Effects of Invention

According to the present invention, when a neighboring cell is activated, handover of a mobile terminal device which communicates with a serving base station to the neighboring cell is limited. Thus, a situation can be avoided, in which a base station device of the neighboring cell is overloaded.

DESCRIPTION OF EXEMPLARY EMBODIMENTS

According to exemplary embodiments of the present invention, a base station device acquires a processing capability index of a neighboring base station device by inter-base-station communication. When the base station device detects that a cell of the neighboring base station device transfers from an inactive state to an active state, the base station device inhibits handover of a mobile terminal device to the activated cell, based on the processing capability index of the neighboring base station device, for a specified period of time. Consequently, increase in processing-load of the neighboring base station can be suppressed. Even a small base-station device with low processing capability can avoid a congestion state due to overload. Hereinafter, exemplary embodiments of the present invention are described in detail with reference to the drawings.

1. First Exemplary Embodiment 1. 1) System Configuration

Figure 2:
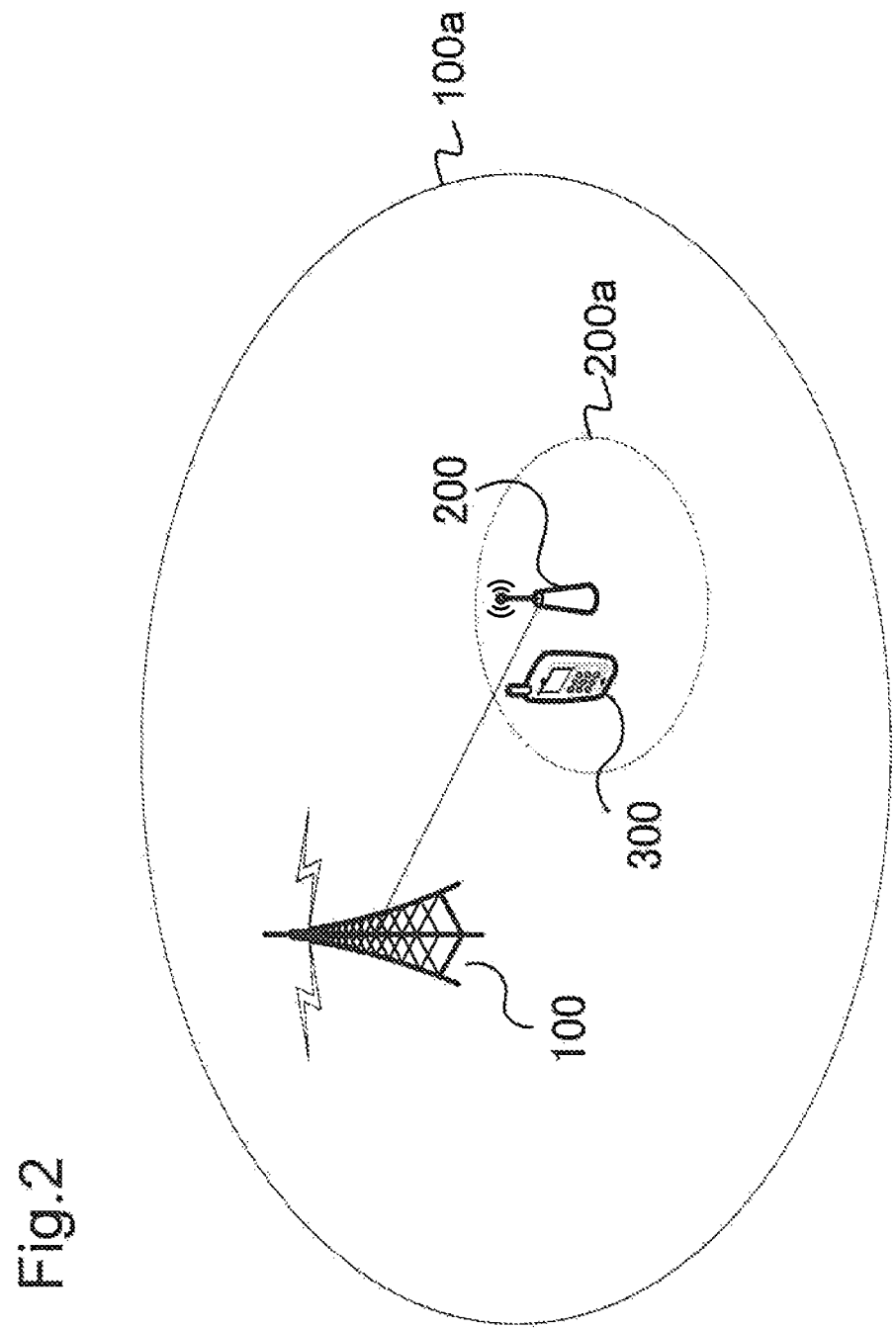
FIG. 2 is a schematic diagram illustrating a schematic configuration of a wireless communication system according to a first exemplary embodiment of the present invention.

In FIG. 2, in order not to complicate description, it is assumed that a wireless communication system according to a first exemplary embodiment is configured by a base station device 100, a small base-station device 200, and a mobile terminal device 300, and that the base station device 100 and the small base-station device 200 are connected via an inter-base-station interface to each other. Here, a cell configuration is illustrated, in which a small cell 200a of the small base-station device 200 is included in a macrocell 100a of the base station device 100. However, the present exemplary embodiment is not limited thereto. Incidentally, the small cell 200a may be either a picocell or a microcell. Additionally, the base station device 100 and the small base-station device 200 may be connected to another base station device (not illustrated) via an inter-base-station interface. Hereinafter, a case where the base station device 100 makes an inactive cell of the small base-station device 200 transition to an active state is described as an example.

1. 2) Base Station Device

Figure 3:
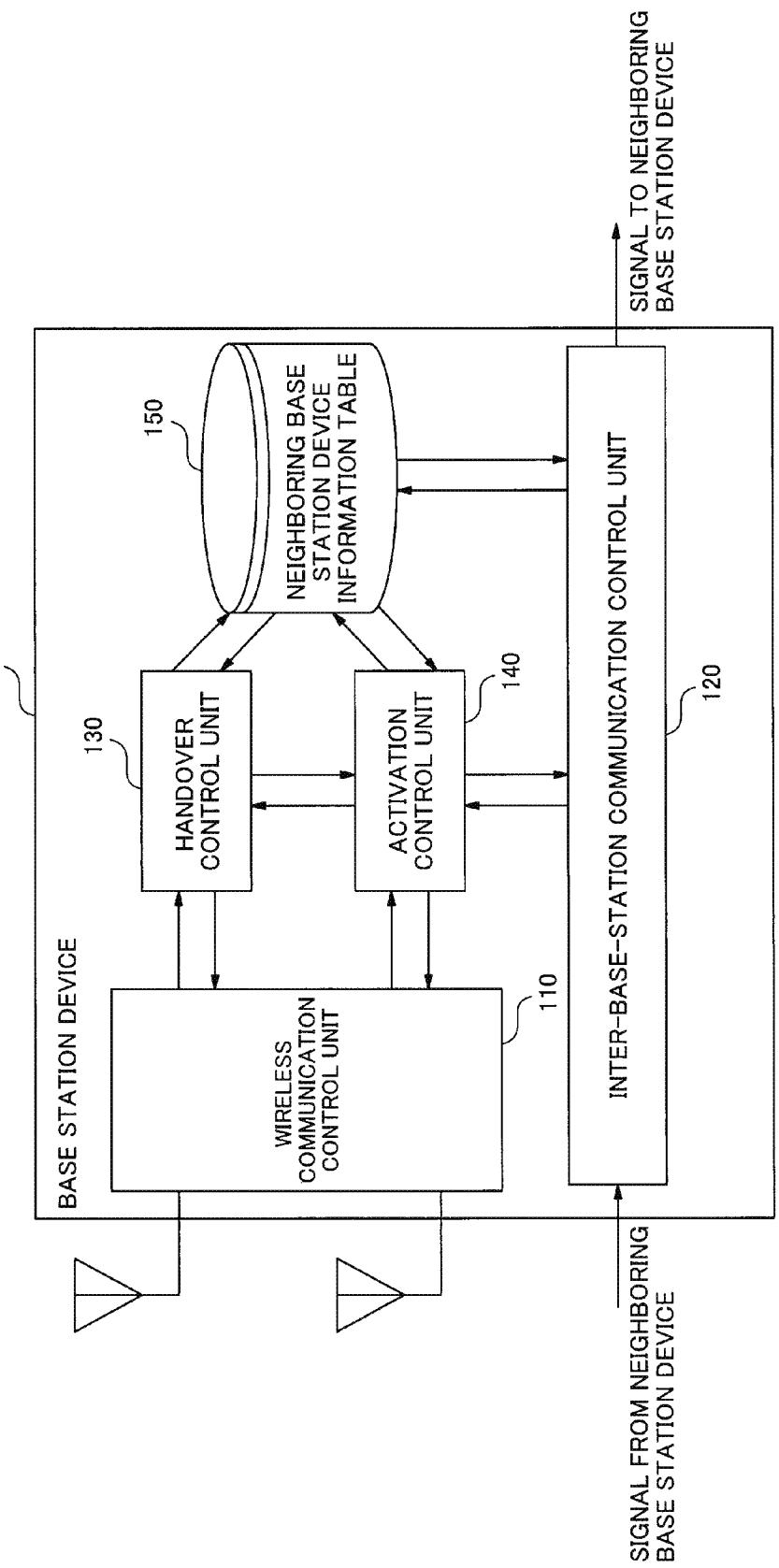
FIG. 3 is a block diagram illustrating a configuration of a base station device according to the present exemplary embodiment.

As illustrated in FIG. 3, the base station device 100 is configured by a wireless communication control unit 110, an inter-base-station communication control unit 120, a handover control unit 130, an activation control unit 140, and a neighboring base station device information table 150. However, here, for simplicity of drawing, only a configuration relating to the present exemplary embodiment is illustrated. The base station device 100 has a control unit equivalent to a base station device used in a general mobile communication system.

The wireless communication control unit 110 is connected to a mobile terminal device via a wireless link, and performs data transmission and reception therewith. The inter-base-station communication control unit 120 establishes an inter-base-station interface with the neighboring base station device, and performs data transmission and reception with the neighboring base station device via the established inter-base-station interface. The handover control unit 130 executes handover execution determination and handover control, based on a measurement report from the mobile terminal device.

The activation control unit 140 determines whether to activate the inactive cell 200a of the small base-station device 200 under the macrocell 100a of the base station device 100. Whether to activate the inactive cell 200a can be determined, based on statistical traffic information in the macrocell 100a. For example, in a traffic-peak time, the inactive cell is controlled to transfer to an active cell.

Figure 4:
FIG. 4 is a schematic diagram illustrating an example of a neighboring base station information table in the present exemplary embodiment.

As illustrated in FIG. 4, the neighboring base station information table 150 has a neighboring base station device ID concerning each of neighboring base station devices neighboring the base station device 100, neighboring cell information concerning a cell of each of the neighboring base station devices, surrounding cell information concerning cells located around the cell of each of the neighboring base station devices, handover inhibition timer information associated with each neighboring cell, the number of times of executing handover to the neighboring cell during the handover inhibition timer is being activated, and information concerning a processing capability index of each of the neighboring base station devices. Information concerning a cell of the neighboring base station device, neighboring cell information concerning a cell of the neighboring base station device, and information concerning the processing capability index of the neighboring base station device are recorded, based on information received when the inter-base-station interface is established.

The handover timer information represents information indicating whether the handover inhibition timer is being activated (ON) or stopped (OFF), and an elapsed time if the timer is being activated. For example, in a cell C1a of a neighboring base station BS1 illustrated in FIG. 4, the handover inhibition timer is activated, and the elapsed time is T1a.

The processing capability index is the number of processable calls per second, or the like. Additionally, the number of times of executing handover represents the number of times of executing, during the handover inhibition timer is being activated, handover processing from the cell 100a of the base station device 100 to the neighboring cell (here, the cell 200a).

Incidentally, functions of the inter-base-station communication control unit 120, the handover control unit 130, and the activation control unit 140 can be implemented by executing programs stored in a memory (not illustrated) on a computer (CPU: Central Processing Unit).

1. 3) Handover Inhibition Control

Figure 5:
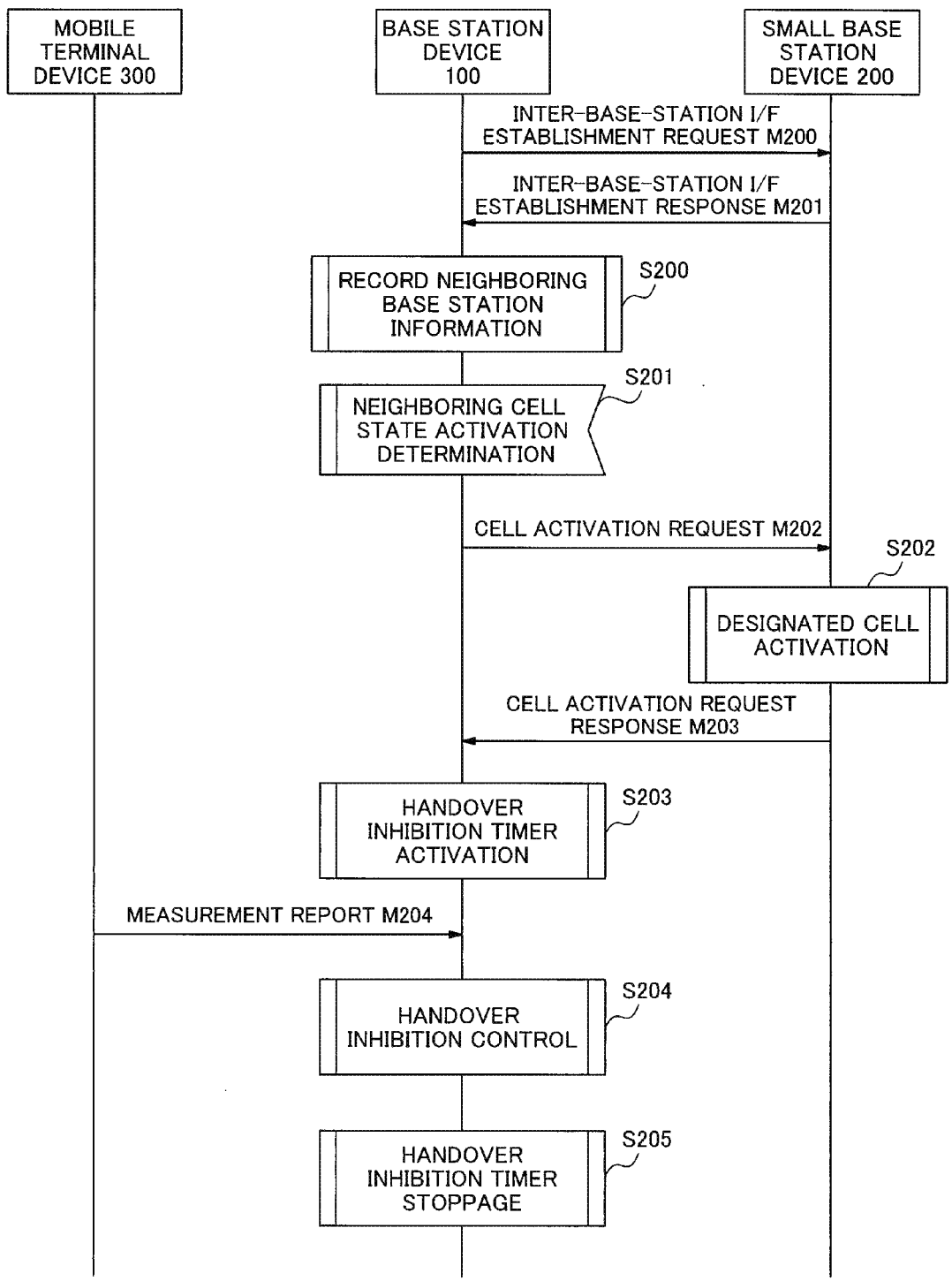
FIG. 5 is a sequence diagram illustrating a handover control procedure according to the present exemplary embodiment.

In FIG. 5, first, the base station device 100 and the small base-station device 200 establish an inter-base-station interface by exchanging an inter-base-station interface establishment request message M200 and a response message M201 thereto. The inter-base-station interface establishment request message M200 and the response message M201 thereto include cell information concerning cells of the base station devices respectively transmitting these messages, neighboring cell information concerning cells of the neighboring base station devices respectively transmitting these messages, and information concerning a processing capability index of each of relevant neighboring base station devices. In the present exemplary embodiment, the base station device transmits the inter-base-station interface establishment request message M200, and the small base-station device transmits the response message M201. However, this may be vice versa.

The inter-base-station control unit 120 of the base station device 100 extracts the above information from the response message M201 received from the small base-station device 200 and records the extracted information in a neighboring base station device information table 150 (operation S200). Next, if it is determined (operation S201) that an inactive cell of the small base-station device 200 is activated, the activation control unit 140 of the base station device 100 transmits a cell activation request message M202 to the small base-station device 200.

The small base-station device 200 activates a cell designated in the cell activation request message M202 (operation S202) and transmits a cell activation request response message M203 to the base station device 100 after the cell is activated. Incidentally, in the present exemplary embodiment, the small base-station device 200 transmits the inter-base-station interface establishment response message M201 in which the neighboring cell information concerning the cell of the small base-station device 200 and the processing capability index of the small base-station device 200 are included. However, the small base-station device 200 may transmit the cell activation request response message M203 in which the neighboring cell information concerning the cell of the small base-station device 200 and the processing capability index of the small base-station device 200 are included. In this case, an operation S200 of the base station device 100 is performed after the base station device 100 receives the cell activation request response message M203.

When the base station device 100 receives the cell activation request response message M203, the handover control unit 130 of the base station device 100 activates a handover inhibition timer associated with the activated designated-cell of the small base-station device 200 (operation S203). When the handover inhibition timer is activated, the handover inhibition timer information in the neighboring base station device information table 150 is updated to ON.

If the handover inhibition timer is being activated, the handover control unit 130 inhibits the handover control conditionally, as is described below, even when receiving a measurement report message M204 from the mobile terminal device 300 (operation S204). Then, when the handover inhibition timer stops after elapse of a predetermined period of time, the handover control unit 130 updates the handover inhibition timer information in the relevant cell in the neighboring base station device information table 150 from ON to OFF, and initializes the number of times of executing handover (i.e., sets the number of times of executing handover to 0) (operation S205).

Hereinafter, the handover inhibition control operation S204 in the base station device 100 according to the present exemplary embodiment is described with reference to FIG. 6.

Figure 6:
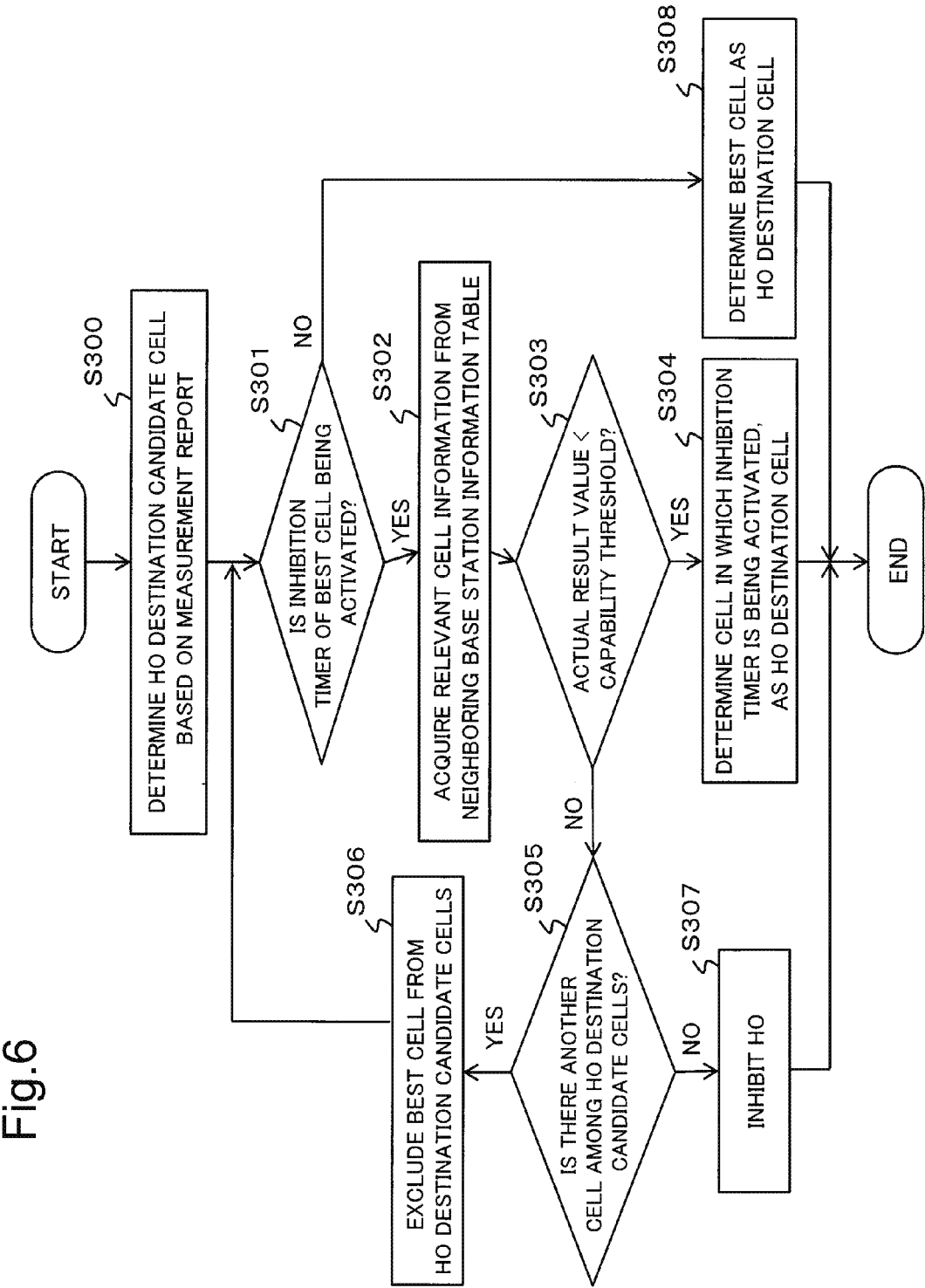
FIG. 6 is a flowchart illustrating a handover control operation of a base station device according to the present exemplary embodiment.

In FIG. 6, when the wireless communication control unit 110 of the base station device 100 receives the measurement report message M204 from the mobile terminal device 300, the handover control unit 130 determines, based on the received measurement report, a handover destination candidate cell (operation S300). Handover destination candidate cell determination processing can select, e.g., all of neighboring cells, each of which is larger in reference signal received power than the serving cell, as the candidate cells. Hereinafter, the handover destination candidate cells are assumed to be determined, based on the reference signal received power. However, a technique of determining a handover destination cell according to a measurement report value other than the received power may be employed.

Next, the handover control unit 130 selects a cell (best cell), which is largest in reference signal received power, from the selected handover destination candidate cells and refers to the neighboring base station device information table 150. Thus the handover control unit 130 determines whether the handover inhibition timer is being activated in the best cell (operation S301). If the handover inhibition timer is being activated (operation S301; YES), the handover control unit 130 acquires cell information concerning the best cell from the neighboring base station device information table 150 (operation S302). The cell information includes the processing capability index of the neighboring base station device (here, the small base-station device 200) controlling the cell concerned, the number of neighboring cells, and the number of times of executing handover thereto.

Next, the handover control unit 130 determines whether a value (actual result value) obtained by dividing a number calculated by adding 1 to the number of times of executing handover included in the acquired cell information by a handover inhibition timer elapsed time is smaller than a value (capability threshold) obtained by dividing the processing capability index by the number of the neighboring cells (operation S303).

If the actual result value is less than the capability threshold (operation S303; YES), the handover control unit 130 can determine that the processing capability of the neighboring base station device has a margin. Therefore, the handover control unit 130 determines the best cell as a handover destination cell (operation S304) and increments the number of times of executing handover of the best cell in the neighboring base station device information table 150 by 1.

If the actual result value is equal to or more than the capability threshold (operation S303; NO), the processing capability of the neighboring base station device of the best cell has no margin. Thus, the handover control unit 130 determines whether there is still another cell among the selected handover destination candidate cells (operation S305). If there is still another cell (operation S305; YES), the handover control unit 130 excludes, from the handover destination candidate cells, the cell of the neighboring base station device concerned (operation S306). Then, the handover control unit 130 returns to the above operation S301. If there are no other cells (operation S305; NO), the handover control unit 130 inhibits handover to the mobile terminal device 300 to the best cell (operation S307).

Figure 1:
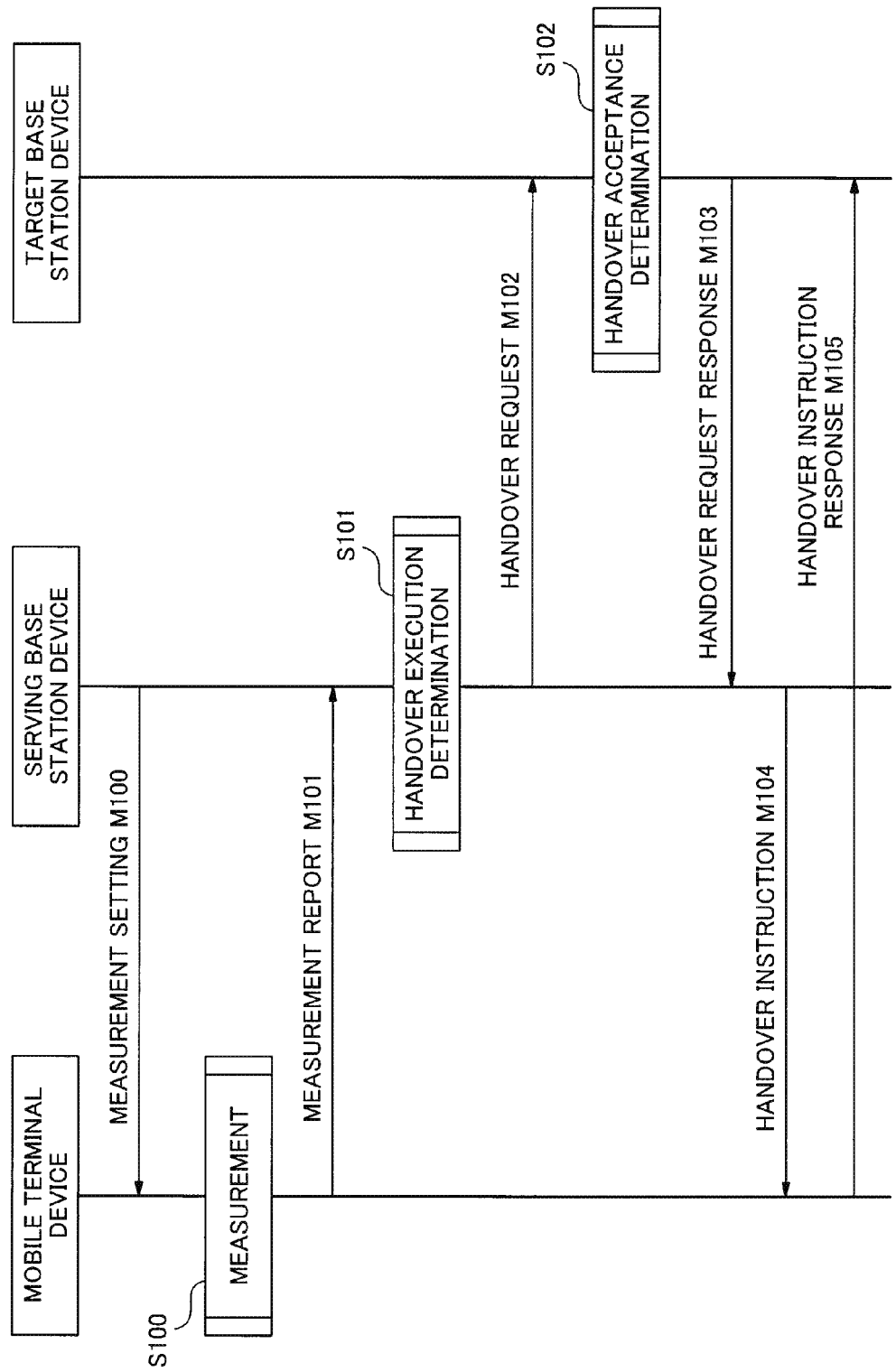
FIG. 1 is a sequence diagram illustrating a general handover control procedure.

Incidentally, if the handover inhibition timer associated with the best cell is being stopped (operation S301; NO), as normal, the handover control unit 130 determines the best cell as a handover destination cell (operation S308). Thus, when the handover destination cell is determined, handover processing is executed as described with reference to FIG. 1.

1. 4) Advantageous Effects

As described above, according to the first exemplary embodiment of the present invention, when a cell of the neighboring small base-station device 200 transitions from an inactive state to an active state, handover of the mobile terminal device 300 to the activated cell 200a is inhibited, based on the processing capability index of the small base-station device 200, for a certain period of time until the inhibition timer is timed out. Consequently, rapid increase in processing-load of the small base-station device 200 can be avoided. Degradation of service quality due to a handover failure and a processing delay can be reduced.

2. Second Exemplary Embodiment

2. 1) System Configuration

Figure 7:
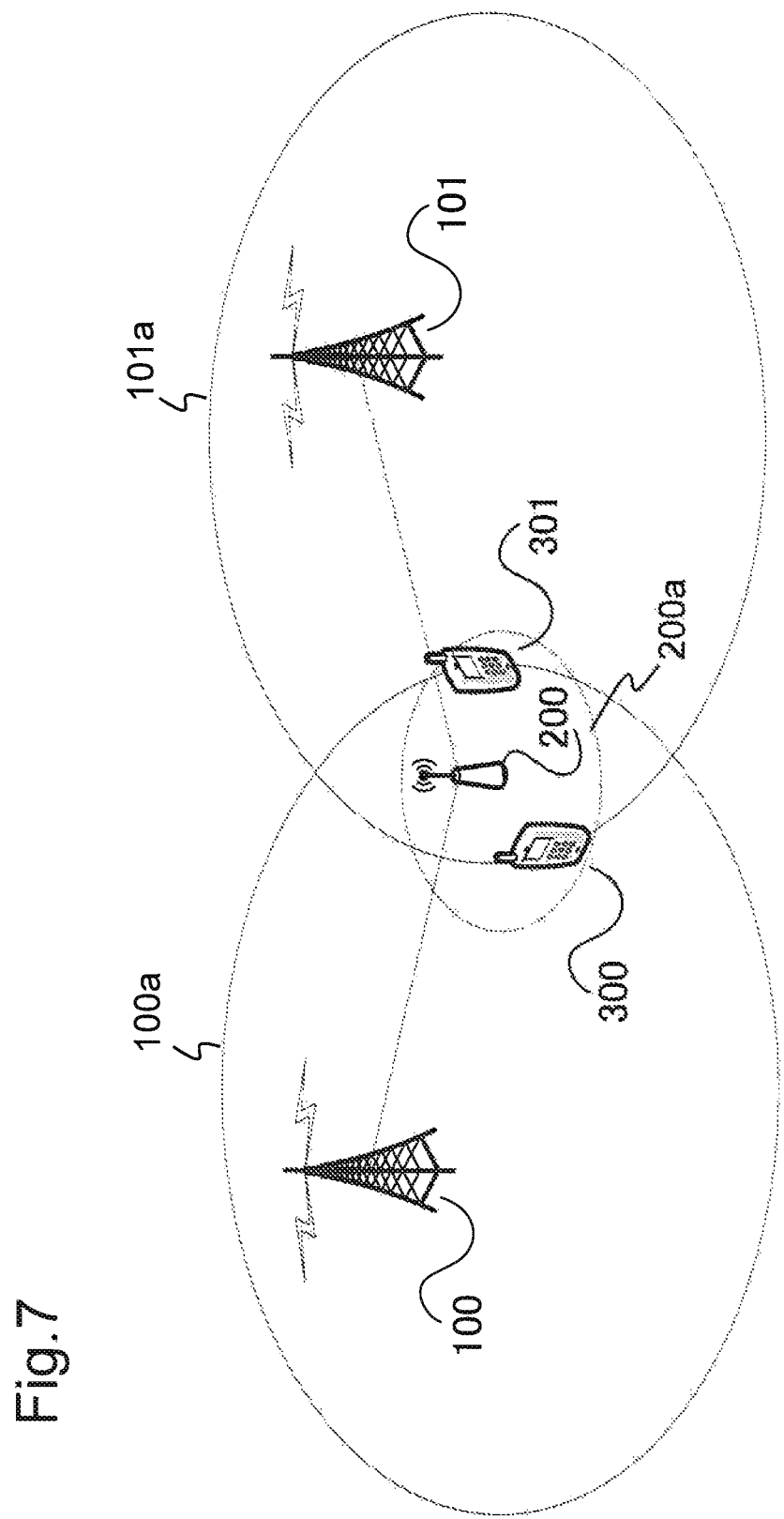
FIG. 7 is a schematic diagram illustrating a schematic configuration of a wireless communication system according to a second exemplary embodiment of the present invention.

In FIG. 7, in order not to complicate description, it is assumed that a wireless communication system according to a second exemplary embodiment is configured by base station devices 100 and 101, a small base-station device 200, and mobile terminal devices 300 and 301, and that each of the base station devices 100 and 101 is connected to the small base-station device 200 via an inter-base-station interface. Here, a cell configuration is illustrated, in which a small cell 200a of the small base-station device 200 is provided in a peripheral portion where a macrocell 100a of the base station device 100 overlaps a macrocell 101a of the base station device 101. However, the present exemplary embodiment is not limited thereto. It is assumed that the mobile terminal device 300 is located in the cell 100a of the base station device 100, and that the mobile terminal device 301 is located in the cell 101a of the base station device 101. Hereinafter, a case where the base station device 100 makes an inactive cell of the small base-station device 200 transition to an active state is described as an example.

2. 2) Base Station Device

The base station devices 100 and 101 each have a configuration similar to the block configuration illustrated in FIG. 3. Therefore, description of the base station devices 100 and 101 is omitted.

2. 3) Handover Inhibition Control

Figure 8:
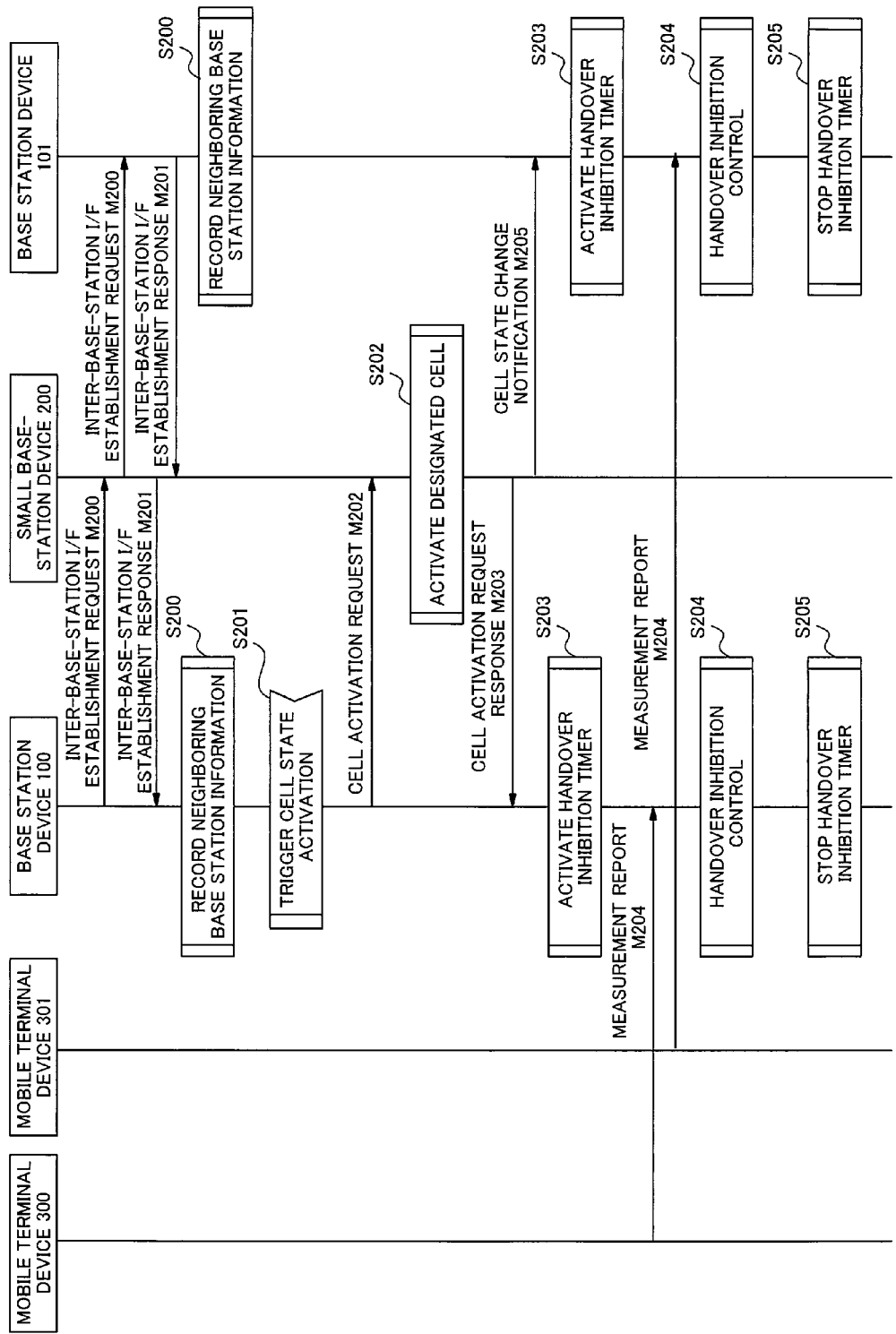
FIG. 8 is a sequence diagram illustrating a handover control procedure according to the present exemplary embodiment.

In a sequence diagram illustrated in FIG. 8, a same operation as that in the handover inhibition control procedure according to the first exemplary embodiment illustrated in FIG. 5 is designated with same reference numeral. Therefore, description of such an operation is omitted. Only different operations in the procedure are described.

As already described, similarly to the procedure in which the base station device 100 and the small base-station device 200 establish the inter-base-station interface, the base station device 101 and the small base-station device 200 establish the inter-base-station interface by exchanging an inter-base-station interface establishment request message M200 and a response message M201 thereto. Then, the base station devices 100 and 101 extract the above information from the response message M201 received from the small base-station device 200 and records the extracted information on a neighboring base station device information table 150 (operation S200). In addition, as described above, the inter-base-station interface establishment request message M200 and the response message M201 thereto include cell information concerning cells located under the transmitting-side base station devices, neighboring cell information concerning cells respectively the neighboring cells of the transmitting-side base station devices, and information concerning a processing capability index of each of relevant neighboring base station devices. As a specific processing capability index, the number of processable calls per second is set.

The small base-station device 200 activates a designated cell according to the cell activation request message M202 received from the base station device 100 (operation S202). After the activation of the cell, the small base-station device 200 transmits a cell activation request response message M203 and a cell state change notification message M205 to the base station devices 100 and 101, respectively. Incidentally, even in the present exemplary embodiment, similarly to the first exemplary embodiment, the neighboring cell information, and information concerning the processing capability index may be transmitted by being included in each of the cell activation request response message M203 and the cell state change notification message M205. In this case, the operation S200 of each of the base station devices 100 and 101 is performed after an associated one of the cell activation request response message M203 and the cell state change notification message M205 is received.

When the base station devices 100 and 101 receive the cell activation request response message M203 and the cell state change notification message M205, respectively, a handover inhibition timer associated with the designated cell activated by the small base-station device 200 is activated (operation S203). When the handover inhibition timer is activated, handover inhibition timer information in a neighboring base station device information table 150 of each of the base station devices 100 and 101 is updated to ON.

If the handover inhibition timer is being activated, the base station device 100 inhibits the handover control conditionally, as already described, even when receiving a measurement report message M204 from the mobile terminal device 300. Similarly, the base station device 101 inhibits the handover control conditionally, even when receiving a measurement report message M204 from the mobile terminal device 301 (operation S204). Then, when the handover inhibition timer stops after elapse of a predetermined period of time, each of the base station devices 100 and 101 updates the handover inhibition timer information in the relevant cell in the neighboring base station device information table 150 from ON to OFF, and initializes the number (=0) of times of executing handover (operation S205). The handover inhibition control operation S204 of the base station device 101 is similar to that of the base station device 100 described with reference to FIG. 6. Therefore, description of the handover inhibition control operation S204 of the base station device 101 is omitted.

3. Supplemental Notes

A part or all of the above exemplary embodiments can also be described as the following supplemental notes. However, the present invention is not limited thereto.

[Supplemental Note 1]

A base station device in a wireless communication system, including:

a neighboring base station information storage means which stores neighboring base station information including handover inhibition information associated with a neighboring cell managed by a neighboring base station device, and a processing capability index of the neighboring base station device; and a handover control means which limits, when the neighboring cell transitions from an inactive state to an active state, handover to the activated neighboring cell of a subordinate mobile terminal device, based on the handover inhibition information and the processing capability index.

[Supplemental Note 2]

The base station device according to Supplemental Note 1, in which the handover inhibition information is a handover inhibition timer that is activated when the neighboring cell transitions from an inactive state to an active state, and that indicates a predetermined handover inhibition time, and in which the handover control means inhibits, during the handover inhibition time, handover of the mobile terminal device to the neighboring cell, based on the processing capability index.

[Supplemental Note 3]

The base station device according to Supplemental Note 2, in which the handover control means permits handover of the mobile terminal device to the neighboring cell only in a case where the processing capability of the neighboring base station device has a margin, if within the handover inhibition time.

[Supplemental Note 4]

The base station device according to Supplemental Note 3, in which the margin of the processing capability of the neighboring base station device is determined by the number of times of executing handover to the neighboring cell within the handover inhibition time, and by the processing capability index.

[Supplemental Note 5]

The base station device according to one of Supplemental Notes 1 to 4, in which the neighboring base station device is a small base-station device located under the base station device.

[Supplemental Note 6]

A handover control method for a base station device in a wireless communication system, including:

storing, in a neighboring base station information storage means, neighboring base station information including handover inhibition information associated with a neighboring cell managed by a neighboring base station device, and a processing capability index of the neighboring base station device; and limiting, when the neighboring cell transitions from an inactive state to an active state, handover to the activated neighboring cell of a subordinate mobile terminal device, based on the handover inhibition information and the processing capability index.

[Supplemental Note 7]

The handover control method according to Supplemental Note 6, in which the handover inhibition information is a handover inhibition timer that is activated when the neighboring cell transitions from an inactive state to an active state, and that indicates a predetermined handover inhibition time, and in which, during the handover inhibition time, handover of the mobile terminal device to the neighboring cell is limited, based on the processing capability index.

[Supplemental Note 8]

The handover control method according to Supplemental Note 7, in which handover of the mobile terminal device to the neighboring cell is permitted only in a case where the processing capability of the neighboring base station device has a margin, if within the handover inhibition time.

[Supplemental Note 9]

The handover control method according to Supplemental Note 8, in which the margin of the processing capability of the neighboring base station device is determined by the number of times of executing handover to the neighboring cell during the handover inhibition time, and the processing capability index.

[Supplemental Note 10]

The handover control method according to one of Supplemental Notes 6 to 9, in which the neighboring base station device is a small base-station device located under the base station device.

[Supplemental Note 11]

A wireless communication system including a plurality of base station devices, one of the plurality of base station devices, including:

a neighboring base station information storage means which stores neighboring base station information including handover inhibition information associated with a neighboring cell managed by a neighboring base station device, and a processing capability index of the neighboring base station device; and a handover control means which limits, when the neighboring cell transitions from an inactive state to an active state, handover to the activated neighboring cell of a subordinate mobile terminal device, based on the handover inhibition information and the processing capability index.

[Supplemental Note 12]

The wireless communication system according to Supplemental Note 11, in which the handover inhibition information is a handover inhibition timer that is activated when the neighboring cell transitions from an inactive state to an active state, and that indicates a predetermined handover inhibition time, and in which the handover control means inhibits, during the handover inhibition time, handover of the mobile terminal device to the neighboring cell, based on the processing capability index.

[Supplemental Note 13]

The wireless communication system according to Supplemental Note 12, in which the handover control means permits handover of the mobile terminal device to the neighboring cell only in a case where the processing capability of the neighboring base station device has a margin, if within the handover inhibition time.

[Supplemental Note 14]

The wireless communication system according to Supplemental Note 13, in which the margin of the processing capability of the neighboring base station device is determined by the number of times of executing handover to the neighboring cell within the handover inhibition time, and by the processing capability index.

[Supplemental Note 15]

The wireless communication system according to one of Supplemental Notes 11 to 14, in which the neighboring base station device is a small base-station device located under the base station device.

[Supplemental Note 16]

A program for implementing, in a computer, a handover control function of a base station device in a wireless communication system, the program implementing, in the computer:

a neighboring base station information storage function of storing neighboring base station information including handover inhibition information associated with a neighboring cell managed by a neighboring base station device, and a processing capability index of the neighboring base station device; and a handover control function of limiting, when the neighboring cell transitions from an inactive state to an active state, handover to the activated neighboring cell of a subordinate mobile terminal device, based on the handover inhibition information and the processing capability index.

INDUSTRIAL APPLICABILITY

The present invention is applicable to a power saving technique in a wireless communication system and, more particularly, to reduction of a load on a small base-station device.

REFERENCE SIGNS LIST

100, 101 base station devices
100a, 101a base station device cells
200a small base-station cell
300, 301 mobile terminal devices
110 wireless communication control unit
120 inter-base-station communication control unit
130 handover control unit
140 activation control unit
150 neighboring base station device information table

The invention claimed is:

1. A base station device in a wireless communication system, the base station device comprising:

a communication unit configured to communicate with a small base station device that is a neighboring base station device, the small base station device being capable of changing states between an active state and an inactive state, the communication unit being further configured to acquire neighboring cell information including a processing capability index of the small base station device contained in a message received from the small base station device;

a neighboring base station device information table configured to store the neighboring cell information, an elapsed time of a handover inhibition timer that counts a predetermined period of time, and actual handover results that indicate a number of permitted handovers for the small base station device while the handover inhibition timer is activated; and a control unit configured to activate the handover inhibition timer to count the predetermined period of time upon detection of a state change of the small base station device from the inactive state to the active state, and to conditionally inhibit handover of mobile terminals to the small base station device during the predetermined period of time based on allowances of the processing capability of the small base station device as a handover target base station device derived from information managed by the neighboring base station device information table.

2. The base station device according to claim 1, wherein the control unit conditionally inhibits the handover to the small base station device based on the processing capability index and the actual handover results managed by the neighboring base station information table.

3. A control method of handover in a base station device, the method comprising:
    communicating with a small base station device that is a neighboring base station device, the small base station device being capable of changing states between an active state and an inactive state;
    acquiring neighboring cell information including a processing capability index of the small base station device contained in a message received from the small base station device;
    storing, in a neighboring base station device information table, the neighboring cell information, an elapsed time of a handover inhibition timer that counts a predetermined period of time, and actual handover results that indicate a number of permitted handovers for the small base station device while the handover inhibition timer is activated;
    activating the handover inhibition timer to count the predetermined period of time upon detection of a state change of the small base station device from the inactive state to the active state; and
    conditionally inhibiting handover of a mobile terminal to the small base station device during the predetermined period of time based on allowances of the processing capability of the small base station device as a handover target base station device derived from information managed by the neighboring base station device information table.

4. The method according to claim 3, wherein the step of conditionally inhibiting handover comprises conditionally inhibiting the handover to the small base station device based on the processing capability index and the actual handover results managed by the neighboring base station information table.

5. The method according to claim 4, wherein the step of conditionally inhibiting the handover is based on comparison between the actual handover results up to current elapsed time of the handover inhibition timer and a value indicating the processing capability obtained by the processing capability index.

6. The method according to claim 5,
    wherein the step of conditionally inhibiting the handover permits the handover to the small base station device when the actual handover results up to current elapsed time of the handover inhibition timer is smaller than a value indicating the processing capability obtained by the processing capability index, and incrementing the actual handover results managed by the neighboring base station device information table by 1, and
    wherein the step of conditionally inhibiting the handover inhibits the handover to the small base station device when the actual handover results up to current elapsed time of the handover inhibition timer is larger than the value indicating the processing capability obtained by the processing capability index.

7. The base station device according to claim 2, wherein the control unit conditionally inhibits the handover to the small base station device based on a comparison between the actual handover results up to current elapsed time of the handover inhibition timer and a value indicating the processing capability obtained by the processing capability index.

8. The base station device according to claim 7,
    wherein the control unit permits the handover to the small base station device when the actual handover results up to current elapsed time of the handover inhibition timer is smaller than a value indicating the processing capability obtained by the processing capability index, and increments the actual handover results managed by the neighboring base station device information table by 1, and
    wherein the control unit inhibits the handover to the small base station device when the actual handover results up to current elapsed time of the handover inhibition timer is larger than the value indicating the processing capability obtained by the processing capability index.

* * * * *